I. E. WARD.
HAY BALER.
APPLICATION FILED JUNE 2, 1913.
1,156,828.
Patented Oct. 12, 1915.
2 SHEETS—SHEET 2.
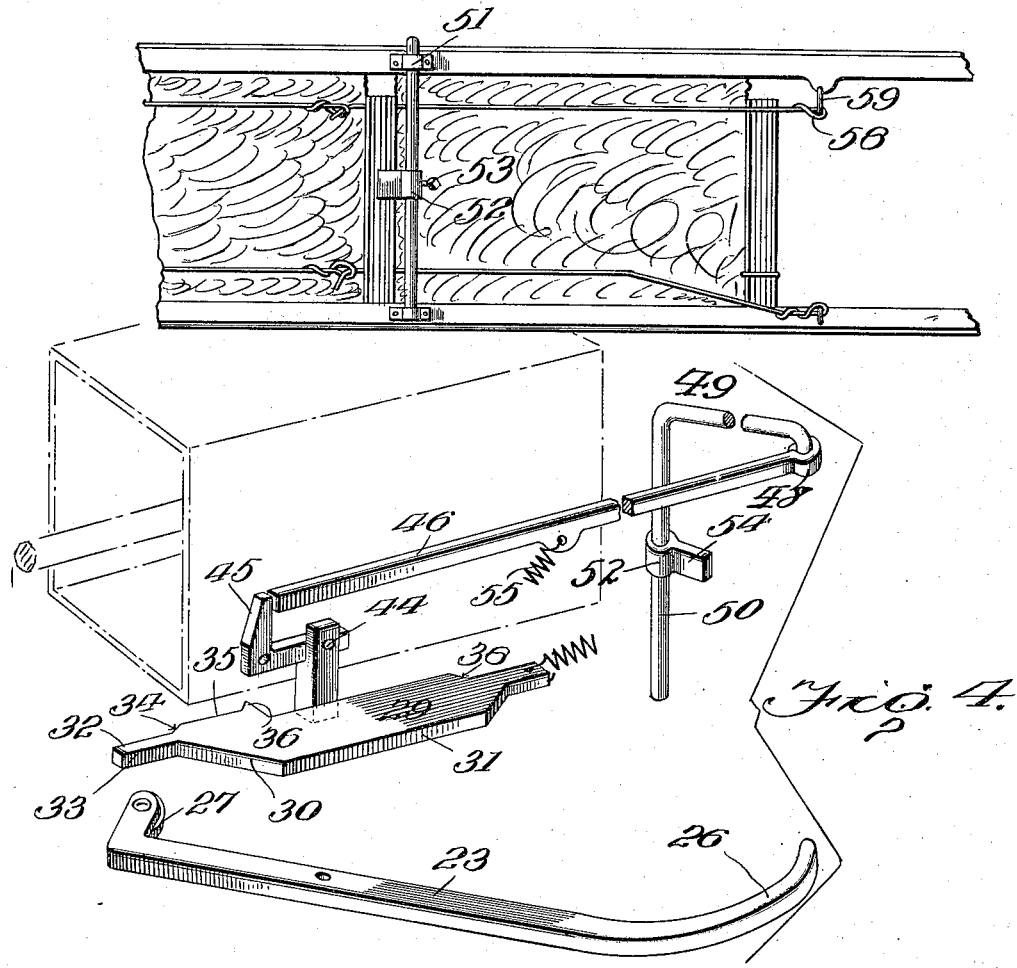
Fig. 3.
Fig. 4.
Fig. 5.
Inventor
I. E. Ward.
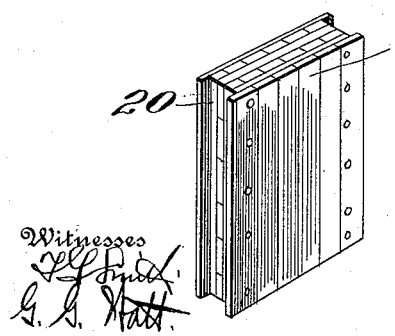
By
Attorney

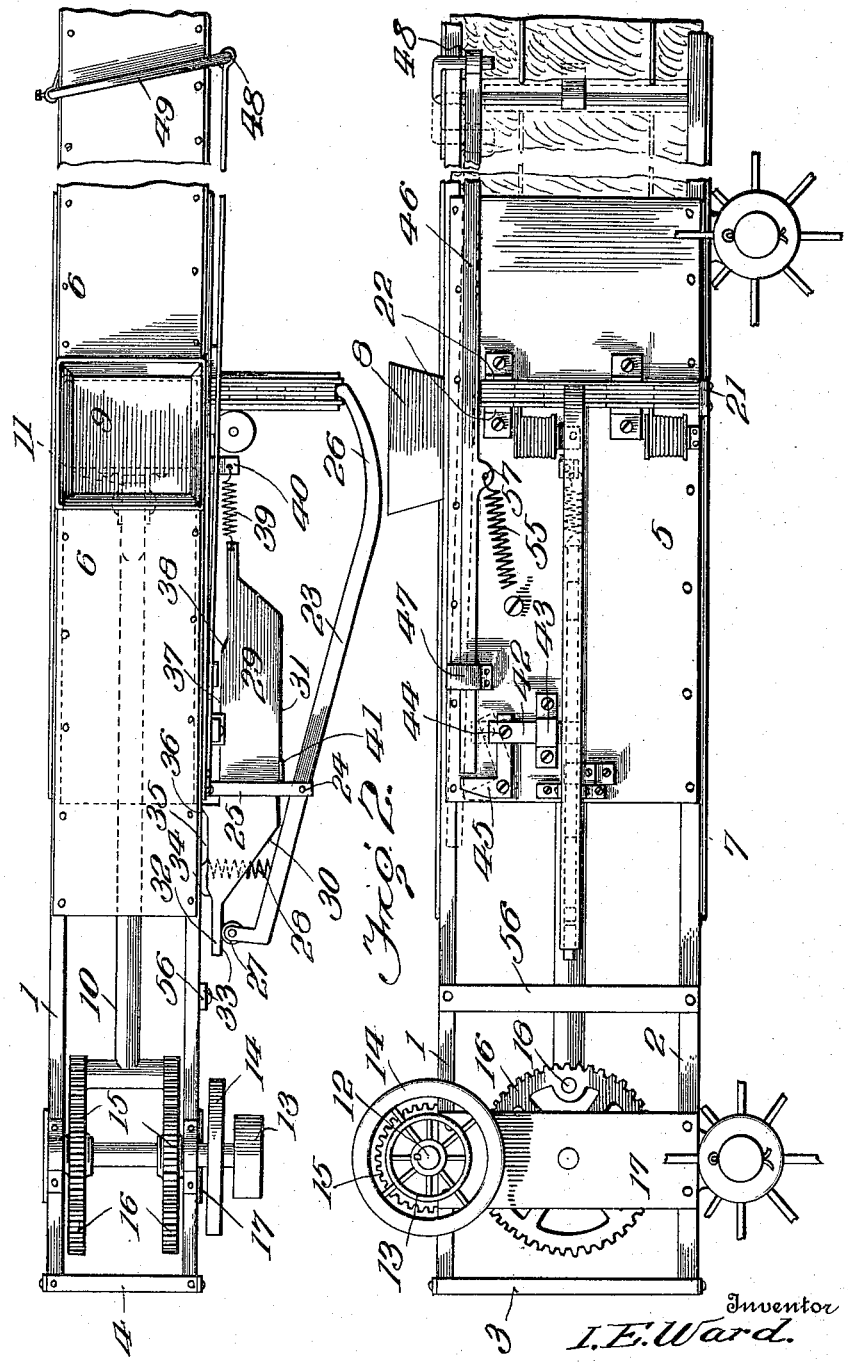

UNITED STATES PATENT OFFICE.

ISAAC E. WARD, OF ANDALE, KANSAS, ASSIGNOR TO THE FOUQUET-WARD BALE TYING COMPANY, OF ANDALE, KANSAS, A CORPORATION OF KANSAS.

HAY-BALER.

1,156,828.          Specification of Letters Patent.          Patented Oct. 12, 1915.

Application filed June 2, 1913. Serial No. 771,345.

*To all whom it may concern:*

Be it known that I, ISAAC E. WARD, a resident of Andale, in the county of Sedgwick and State of Kansas, have invented certain new and useful Improvements in Hay-Balers; and I do hereby declare the following to be a full, clear, and exact description of the invention, such as will enable others skilled in the art to which it appertains to make and use the same.

This invention relates to baling presses and more particularly to that class in which a division block is placed in the hay race and against which block the hay is packed, and it is one aim of the invention to provide means, actuated by movement of the packer or plunger, to automatically place the blocks within the hay race.

Another aim of the invention is to provide means whereby the movement of a division block into the hay race will serve to automatically place the bale wires across the race.

In the accompanying drawings: Figure 1 is a plan view of the baling press embodying the present invention. Fig. 2 is a side elevation thereof. Fig. 3 is a side elevation of one end of the press. Fig. 4 is a perspective view, illustrating a portion of the mechanism, the parts being shown approximately in their proper relative positions. Fig. 5 is a perspective view of one of the division blocks.

Corresponding and like parts are referred to in the following description and indicated in all the views of the accompanying drawings by the same reference characters.

The baling press embodying the present invention includes a wheel supported frame including upper angle iron beams 1 and lower beams 2. The beams at each side of the frame are spaced at the forward end of the frame by means of bars 3 and the beams 1 and 2 are spaced at the top and bottom of the frame at the forward end thereof by means of cross bars 4. Side plates 5 are secured to the beams 1 and 2 at each side of the frame and constitute the side walls of the hay race, and plates 6 are secured upon and extended between the beams 1 and constitute the top wall of the said hay race. A plate 7 is in a like manner secured to and extends between the beams 2 and constitutes the bottom or floor of the hay race.

The numeral 8 indicates a hopper mounted between the plates 6 through which hopper the hay to be baled is to be introduced into the hay race.

The baling mechanism includes the usual packer or plunger, indicated by the numeral 9, which packer is preferably hollow and, of course, is mounted to reciprocate within the hay race. The plunger rod is indicated by the numeral 10 and is pivotally connected, as at 11, within the packer 9. A shaft 12 is mounted in bearings upon the frame beams 1 and this shaft carries a pulley 13 and a flywheel 14 and fixed upon the shaft are gears 15 which mesh with gears 16 having their shafts journaled in plates 17 secured upon the frame beams at each side of the frame. The gears 16 are connected by a crank pin 18 to which the plunger 10 is in turn connected, as shown in Figs. 1 and 2. It will now be apparent that when power is applied to the shaft 12, the gears 16 will be rotated, thereby imparting reciprocatory motion to the plunger rod 10 and the packer 9.

As before stated, the press embodying the present invention is of that type in which division blocks are placed within the hay race and one of these division blocks is clearly shown in Fig. 5 of the drawings. Each of these blocks is preferably made up of a number of layers, each of which consists of a number of wooden strips 19 and the strips of the several layers are alternately arranged in cross relation, and by reference to the said Fig. 5 it will be observed that the end strips at the opposite side edges of the block project at short distances so as to provide grooves or recesses 20 in the said opposite edges of the block, the purpose of which recesses will be presently fully explained. An opening (not shown) is provided in one side wall 5 of the hay race, and projecting laterally from the bottom of the hay race at the lower end of this opening is a supporting plate 21 upon which is to be disposed the lower end of the block to be placed within the hay race. In order to support the block in upright position, pairs of supporting arms 22 are secured to the side wall 5 of the hay race and project laterally therefrom, the arms of each pair being spaced and being located at opposite sides of the opening in the said side wall so as to engage the opposite sides of the division block disposed upon the plate 21.

As a means for moving or sliding the division blocks into the hay race, there is provided a rocking arm which is actuated by the movement of the packer 9. This arm is indicated by the numeral 23 and is pivotally mounted, as at 24, in a bracket 25 which extends laterally from the side wall 5 of the hay race. The rear end of the arm 23 is curved in the general direction of the hay race, as indicated at 26, and is arranged to engage against the outer side edge of a division block upon the plate 21, in the manner shown in Fig. 1 of the drawings. At its opposite end, the arm is bifurcated and a roller 27 is mounted in the bifurcation and is designed to ride against one edge of a cam member as will now be explained. As will be apparent from an inspection of Fig. 1 of the drawings, a spring 28 is connected to the arm 23 between the pivot 24 and roller 27 and is also connected to the side wall of the hay race or some other convenient portion of the structure, and this spring serves to yieldably hold the roller 27 in engagement with the outer cam edge of the said cam member. The cam member is in the nature of a plate 29 and is slidably fitted between the bracket arms 25 and provided near its forward end with an inclined cam edge portion 30. The said outer edge of the cam plate 29 is straight and parallel to the side of the hay race for the greater portion of its length and rearwardly beyond its inclined portion 30, as indicated at 31, and at its forward end the cam plate 29 is provided with a relatively narrow forward extension 32, the outer edge 33 of which is parallel to the edge portion 31 of the plate. The inner edge of the cam plate 29, or, in other words, that edge located next adjacent the hay race, is provided with an inclined cam edge portion 34 located immediately rearwardly of the extension 32 and rearwardly beyond the edge portion 34. The inner edge of the cam plate is straight and parallel to the side wall of the race, as indicated at 35. The said inner edge of the cam plate is formed with a tooth 36 projecting laterally inwardly toward the hay race and located at the rear end of the edge portion 35. Rearwardly beyond the tooth 36, the said inner edge of the cam plate is parallel to the side wall of the hay race, as indicated at 37, and is thence inclined to form a cam edge portion 38. A spring 39 has one end connected to the rear end of the cam plate 29 and its other end connected to a bracket 40 upon the wall of the race. The tendency of the spring 39 is of course to move the cam plate 29 in a rearward direction. A spring 41 is mounted upon the said side wall 5 of the hay race and bears against the edge portion 31 of the cam plate and the tendency of this spring is to shift the plate laterally inwardly toward the said wall of the race. The cam plate is normally held against such movement, however, by means of a detent 42 slidably mounted in a bearing 43 upon the said wall 5 and normally projecting at its lower end in position for the engagement therewith of the edge portion 37 of the cam plate for the purpose stated. The detent 42 is pivoted, as at 44, to one arm of an angle lever 45, the other arm of this lever standing substantially vertically beside the wall 5. As a means for rocking the arm for the purpose of lifting the detent 42 out of position for engagement by the edge portion 37 of the cam plate 29, there is provided a trip bar 46 slidably mounted in a bracket 47 upon the wall 5 and having its forward end located in juxta-position to the upper end of the vertical arm of the angle lever 45. The opposite end of the rod 46 is pivotally connected, as at 48, to the angularly disposed end of a rock arm 49 extending from the upper end of a shaft 50 mounted in suitable bearings 51 upon the frame of the machine. Fixed upon the said shaft 50 is a collar 52 held in place and at proper adjustment by means of a set screw 53. This collar carries a wing 54. A spring 55 is connected to the bar 46 and to the wall 5, and has a tendency to move the said bar forwardly, as a result of which, a forward pull is normally exerted upon the angularly disposed end of the arm 49, whereby the shaft 50 will have a tendency to rotate in such direction as to swing the wing 54 inwardly toward the hay race. For a purpose to be presently pointed out, a bar 56 is secured at its upper and lower ends to the frame beams at that side of the machine at which the mechanism above described is located, and this bar is in the path of forward movement of the cam plate 29.

In order that the operation of the machine may be well understood, it may be stated at this point that as the bales are completed, they are moved rearwardly in the hay race, together with the division blocks, which are located between them. As the bales move in the direction stated, they will engage the wing 54 of the shaft 50 and will force this wing inwardly, thereby rocking the shaft against the tension of the spring 55 until the parts have assumed approximately the position shown in Figs. 1 and 2. As soon as a completed bale has moved past the wing 54 and one of the division blocks arrives at a position opposite the said wing, the force exerted by the spring 45 will cause the wing to swing into the recess in the adjacent side of the division block. When this occurs, the shaft 50 will have a slight rocking movement and the arm 49 will be swung forwardly, thereby shifting the bar 46 in a corresponding direction. As the bar 46 is moved forwardly, its forward end will engage the vertical arm of the angle lever 45 and the detent 42 will be slid upwardly so as to bring its lower end out of position for engagement with the inner edge of the cam plate 29. The spring 41 will then act to force the cam plate inwardly. At this time, the packer 9 will be in the position shown in Fig. 4 of the drawings. In this position of the packer, the edge of one side wall thereof will substantially register with the adjacent edge of the side wall 5 upon which the mechanism, above described, is mounted. As the cam plate 29 is moved inwardly, its tooth 36 will be brought to position behind the said edge of the packer. Now, as the operation of the press continues, the packer will be moved rearwardly and in such movement, the camp late 27 will be correspondingly moved, due to the engagement of its tooth 36 with the edge of the side wall of the packer. In this movement of the cam plate, the travel of the cam edge portion 30 thereof against the roller 27 will result in the roller carrying end of the arm 23 being swung outwardly, and as the result, the opposite end of this arm will be swung inwardly, carrying with it the division block which has been previously disposed upon the supporting plate 21 and between the arms 22. The parts are so proportioned that when the roller 27 reaches the edge portion 31 of the cam plate, the block will be properly positioned within the hay race. As soon as the cam plate 29 has been moved forwardly, through the medium of the packer, a sufficient distance to insure of the proper placing of the division block within the hay race, the continued movement of the cam for a short distance will result in the edge portion 34 being brought into engagement with the bar 56, and as this edge portion 34 rides against the bar, the forward end of the cam will be moved outwardly a sufficient distance to cause the disengagement of the tooth 36 from the edge of the side wall of the packer. In the meantime, the detent 42 has returned to its normal position. As soon as the tooth 36 has been disengaged from the packer, the spring 39 will act immediately to pull the cam plate 29 rearwardly, and in this movement of the cam plate, the edge portion 38 thereof will ride against the lower end of the detent and the cam plate will be guided to its normal position and with its edge portion 37 engaging against the said end of the detent.

Mounted upon the side wall 5 are spools 57 upon which the bale wires are wound. The wires are led from these spools across the hay race and at their free ends are formed with loops 58 which are engaged with pins 59 located at the opposite side of the frame of the baling press. It will be understood of course that the bale as it is being formed carries or feeds the wire with it into the hay race and after the bale has been completed, the wires are cut and their free ends are fitted through the said loops 58 in the manner shown in Fig. 3 of the drawings and are twisted or otherwise permanently secured. It will be understood of course that the provision of the recesses in the opposite edges of the division blocks permits of the wire being readily cut after the completion of each bale.

Having described the construction and assembling of my device, what I claim is:

1. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, and a slidably mounted cam arranged for actuation by the movement of the packer to rock the said arm.

2. In a baling press, a baling chamber, a packer working therein, means at one side of the chamber for supporting a division block, an arm mounted for rocking movement and arranged to coöperate with a division block upon said supporting means to move the block into the supporting chamber when the arm is rocked in one direction, a cam member arranged for actuation by movement of the packer to rock the arm, and means for holding the said cam in inactive relation to the packer, the said means being arranged for actuation by movement of a bale to release the cam for actuation.

3. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, a cam mounted for sliding movement and for lateral movement and in its latter movement being arranged to be brought into and out of coöperative relation to the packer, the said cam being arranged for coöperation with the said arm when moved by the packer to rock the arm, and means for holding the cam in position out of the path of movement of the packer, the said means being arranged for actuation to release the cam for actuation.

4. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, a cam mounted for sliding movement and for lateral movement and in its latter movement being arranged to be brought into and out of coöperative relation to the packer, the said cam being arranged for coöperation with the said arm when moved by the packer to rock the arm, and means for holding the cam in position out of the path of movement of the packer, the said means being arranged for actuation by the movement of a bale to release the cam for actuation by the packer.

5. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, a member mounted beside the chamber and movable into and out of coöperative relation to the packer and arranged when in coöperative relation to the packer to be actuated by the movement of the packer and to rock the said arm, means for moving the said member into coöperative relation to the packer, and means arranged to restrain the member against such movement.

6. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, a member mounted beside the chamber and movable into and out of coöperative relation to the packer and arranged, when in coöperative relation to the packer, to be actuated by the movement of the packer and to rock the said arm, means for moving the said member into coöperative relation to the packer, and means arranged to restrain the member against such movement, the said means being arranged for actuation by movement of a bale to release the said member for actuation by its moving means.

7. In a baling press, a baling chamber having an opening in one wall opposite the throat of the chamber, a plunger working in the said chamber, bale wire storage means at that side of the chamber at which the said opening is located, means at the opposite side of the chamber for holding a bale wire passed from the wire storage means through the said opening, the formation of the bale by the plunger being against the length of wire extending across the throat of the chamber and the advancement of the bale in the chamber serving to draw the bale wire across the said opening, and means for placing a division block in the chamber through said opening, the movement of the block into the chamber serving to feed the bale wire from the wire storage means across the throat of the chamber.

8. In a baling press, a baling chamber, a packer working therein, means at one side of the chamber for supporting a division block, an arm mounted for rocking movement and arranged to coöperate with a division block upon said supporting means to move said block into the baling chamber when the arm is rocked in one direction, a cam bar mounted for sliding movement beside the baling chamber and arranged for movement into and out of coöperative relation to the packer, means tending to move the cam bar into operative relation to the packer, a detent arranged in the path of movement of the cam bar into operative relation to the packer, and means actuated by the movement of a completed bale for moving the detent out of such position.

9. In a baling press, a baling chamber, a packer working therein, means at one side of the chamber for supporting a division block, an arm mounted for rocking movement and arranged to coöperate with a division block upon said supporting means to move said block into the baling chamber when the arm is rocked in one direction, a cam bar mounted for sliding movement beside the baling chamber and arranged for movement into and out of operative relation to the packer, means tending to move the cam bar into operative relation to the packer, a detent arranged in the path of movement of the cam bar into operative relation to the packer, an angle lever connected with the said detent, an arm arranged for rocking movement and to be rocked by the movement of a completed bale, and means connected with the arm for coöperation with the angle lever to actuate the same to move the detent out of such position.

10. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, a member mounted for sliding movement beside the chamber and having a cam surface arranged for coöperation with the arm whereby, when the member is slid in one direction, the arm will be rocked to so move the block, the said member being movable into and out of coöperative relation to the packer, a detent arranged in the path of movement of said member into coöperative relation to the said packer, and means for moving the detent into and out of position to restrain the said member against such movement, the said member having a cam surface for coöperation with the detent in the return movement of the member, whereby the member upon such return movement will be moved out of coöperative relation to the packer.

11. In a baling press, a baling chamber, a packer working therein, means at one side of the chamber for supporting a division block, an arm mounted for rocking movement and arranged to coöperate with a division block upon said supporting means to move the block into the baling chamber when the arm is rocked in one direction, a member mounted for sliding movement beside the chamber and having a cam surface arranged for coöperation with the arm whereby, when the member is slid in one direction, the arm will be rocked to so move the block, the said member being movable into and out of coöperative relation to the packer, a detent arranged in the path of movement of the said member into coöperative relation to the said packer, means for moving the detent into and out of position to restrain the said member against such movement, the said member having a cam surface for coöperation with the detent in the return movement of the member whereby the member, upon such return movement, will be moved out of coöperative relation to the packer, and means for automatically returning the member to normal position.

12. In a baling press, a baling chamber, a packer working therein, means at one side of the baling chamber for supporting a division block, a division block adapted for disposal upon said supporting means and provided in one edge with a recess, means arranged for actuation to move the block into the baling chamber, and means for actuating the said block moving means including a rocking arm mounted beside the baling chamber and arranged to be held by engagement with a bale in position inactive to cause actuation of the means for operating the block moving means, the arm being arranged for movement in the recess in the division block and upon such movement to render the actuating means inactive to actuate the block moving means.

13. In a baling press, a baling chamber having an opening in one wall opposite the throat of the chamber, bale wire storage means located in juxtaposition to the said opening, the movement of the bale in the chamber serving to draw the wire from the said storage means across the said opening, a division block to be placed in the baling chamber through the said opening, and means for placing the block in the said chamber, the movement of the block into the chamber serving to draw the wire from the storage means across the throat of the chamber.

14. In a baling press, a baling chamber having an opening in one wall opposite the throat of the chamber, bale wire storage means located in juxtaposition to the said opening, the movement of the bale in the chamber serving to draw the wire from the said storage means across the said opening, a division block to be placed in the baling chamber through the said opening, and means for placing the block in the said chamber, the movement of the block into the chamber serving to draw the wire from the storage means across the throat of the chamber, that edge of the block which is to be disposed against the wire extending across the said opening having spaced portions to engage the wire whereby the length of the wire extending between the said portions may be readily engaged and severed.

In testimony whereof, I have signed this specification in the presence of two subscribwitnesses.

ISAAC E. WARD.

Witnesses:
W. Brown,
W. D. Jochems.

Copies of this patent may be obtained for five cents each, by addressing the "Commissioner of Patents, Washington, D. C."